US008298492B2

(12) United States Patent
Shiotani et al.

(10) Patent No.: US 8,298,492 B2
(45) Date of Patent: Oct. 30, 2012

(54) BEVERAGE DISPENSER

(75) Inventors: Masaru Shiotani, Fukuchiyama (JP); Nana Shiotani, Fukuchiyama (JP)

(73) Assignee: Kabushiki Kaisha Cosmo Life, Hyogo (JP)

( * ) Notice: Subject to any disclaimer, the term of this patent is extended or adjusted under 35 U.S.C. 154(b) by 378 days.

(21) Appl. No.: 12/602,510

(22) PCT Filed: Jan. 30, 2009

(86) PCT No.: PCT/JP2009/051576
§ 371 (c)(1),
(2), (4) Date: Dec. 1, 2009

(87) PCT Pub. No.: WO2010/023967
PCT Pub. Date: Mar. 4, 2010

(65) Prior Publication Data
US 2012/0000861 A1    Jan. 5, 2012

(30) Foreign Application Priority Data

Aug. 27, 2008 (JP) ................................. 2008-218098
Jan. 22, 2009 (JP) ................................. 2009-011697

(51) Int. Cl.
C02F 1/78 (2006.01)
(52) U.S. Cl. .................... 422/186.12; 210/760; 210/192; 210/205
(58) Field of Classification Search .................. 210/760, 210/188, 192, 198.1, 205, 220; 422/28, 30, 422/120, 121, 123, 186.07, 186.12; 95/138; 96/226; 222/189.09
See application file for complete search history.

(56) References Cited

U.S. PATENT DOCUMENTS

| 6,197,189 | B1 * | 3/2001 | Schwartz et al. | 210/192 |
| 6,561,382 | B2 * | 5/2003 | Shelton | 210/760 |
| 6,607,672 | B2 * | 8/2003 | Koslow et al. | 210/760 |
| 2004/0028572 | A1 * | 2/2004 | Sham et al. | 422/123 |
| 2007/0196244 | A1 * | 8/2007 | Croft | 422/121 |

FOREIGN PATENT DOCUMENTS

| JP | 58-8666 | 1/1983 |
| JP | 2000-85892 | 3/2000 |
| JP | 2001-201989 | 7/2001 |
| JP | 2002-143871 | 5/2002 |
| JP | 3099926 | 12/2003 |
| JP | 2004-315049 | 11/2004 |
| JP | 2005-170432 | 6/2005 |
| JP | 2005-350067 | 12/2005 |
| JP | 2006-341915 | 12/2006 |

* cited by examiner

*Primary Examiner* — Lucas Stelling
(74) *Attorney, Agent, or Firm* — Wenderoth, Lind & Ponack, LLP.

(57) ABSTRACT

A beverage dispenser has a simple configuration that prevents invasion of bacteria into a tank or a raw water container. An air intake 13 is provided on the top of a cold tank 4 so that air is taken in as the water level in the tank is lowered, and an air chamber 14 having an air inlet 16 for the outside air is connected to the air intake 13. In the air chamber 14, an ozone generator 15 generating ozone from oxygen in the air from the air inlet 16 is provided so that bacteria included in the air from outside is killed in the air chamber 14 connected to the air intake 13 by the excellent bactericidal effect of ozone. Invasion of bacteria into the tank or the raw water container is thus prevented with this simple configuration.

21 Claims, 8 Drawing Sheets

BEVERAGE DISPENSER

BACKGROUND OF THE INVENTION

1. Technical Field

This invention relates to a beverage dispenser for storing drinking water from a raw water container in a tank and dispensing it through an extraction valve.

2. Background Art

In a beverage dispenser comprising a connecting portion on which a downwardly extending spout of a raw water container filled with drinking water is mounted, a tank provided below this connecting portion for storing the drinking water falling from the raw water container, and an extraction valve that extracts the drinking water stored in the tank, air comes into the tank from outside as the water level in the tank lowers. Many beverage dispensers of such kind have a cold tank with a cooling device and a hot tank with a heating device, being able to dispense cold water and hot water separately.

Thus in such a beverage dispenser, microbes such as bacteria and virus in the outside air are introduced into the tank with air, contaminating the drinking water inside the tank. In a beverage dispenser with a hard raw water container, in which air comes into the container as water in the container falls, drinking water in the raw water container is also contaminated by these bacteria. In a beverage dispenser with a soft raw water container, in which the container collapses as the water inside the container falls, air does not come into the container.

Known anti-bacterial means for such beverage dispensers include providing an ultraviolet bactericidal device immediately before the extraction valve (e.g. Patent Document 1); immersing an ultraviolet lamp in the tank and attaching an ultrasonic element to sterilize the water in the tank during agitation (e.g. Patent Document 2); providing a circulating path through which the drinking water extracted from the tank circulates and sterilizing with a means such as an ultraviolet lamp in the circulating path (e.g. Patent Document 3); for a dispenser with a cold tank and hot tank, providing a heat sterilizing device to sterilize water in the cold tank that is more prone to contamination (e.g. Patent Document 4); and to introduce heated drinking water from the hot tank to the cold tank, which is more prone to contamination (e.g. Patent Document 5).

Patent Document 1: JP 2000-85892A
Patent Document 2: JP U 3099926
Patent Document 3: JP 2005-350067A
Patent Document 4: JP 2004-315049A
Patent Document 5: JP 2005-170432A All the anti-bacterial means for known beverage dispensers described in Patent Documents 1 to 5 kill bacteria after they are introduced into the drinking water from air. Therefore there may remain bacteria in the air in the tank or in the raw water container, and these bacteria may propagate. Large amounts of these propagated bacteria may be introduced into the drinking water and sterilizing is not done thoroughly.

Also, the means described in Patent Document 2 requires agitation means in the tank, and the means described in Patent Documents 3 and 5 requires the extra circulation path or an introduction path from hot tank to cold tank, which makes the beverage dispenser more complicated in structure and thus more costly. While the means in Patent Document 1 is simple in structure, its sterilizing may not be thorough enough. With the means in Patent Document 5, the cold water cannot be extracted during sterilizing in the cold tank.

SUMMARY OF THE INVENTION

An object of this invention is to provide a beverage dispenser with simple structure that can prevent introduction of bacteria to the tank or to the raw water container from the root.

To achieve the object, this invention adopts a configuration of a beverage dispenser comprising a connecting portion connected to a downwardly extending spout of a raw water container filled with drinking water is mounted, a tank provided below the connecting portion for storing the drinking water falling from the raw water container, and an extraction valve that extracts drinking water stored in the tank, characterized in that an air intake is provided at least either on top of the tank or on the connecting portion to take air in as the level of water in the tank is lowered, that an air chamber is connected to the air intake, the air chamber being provided with an air inlet so as to let air in from outside, that the air chamber comprises a horizontal portion connected to the air intake and a vertical portion hanging from the horizontal portion, that an ozone generator is provided in the horizontal portion for generating ozone from oxygen in the air that enters through the air inlet, and that the air inlet is provided at the bottom of the vertical portion.

In particular, an air intake is provided at least on one of the top of the tank or the connecting portion so that air is taken in as the water level in the tank is lowered, and an air chamber having an air inlet for the outside air is connected to an air intake, wherein the air chamber is provided with a horizontal portion connected to the air intake and a vertical portion hanging from the horizontal portion, wherein an ozone generator is provided in the horizontal portion, the ozone generator generating ozone from oxygen in the air that enters though the air inlet, and wherein the air inlet is provided at the bottom of the vertical portion so that ozone, which has large specific gravity, generated in the horizontal portion falls into the vertical portion, contacts efficiently with the outside air from the air inlet on the bottom of the vertical portion and bacteria included in the air from outside is killed by the excellent bactericidal effect of ozone, thereby preventing invasion of bacteria into the tank or the raw water container from the root.

Providing the ozone generator right over the vertical portion makes it possible to let the generated ozone immediately fall to the vertical portion, thereby making the bactericidal effect quickly act when the ozone generator starts to operate. This configuration is especially effective when the ozone generator operates synchronously with entry of outside air into the air chamber.

Providing the vertical portion with at least one partitioning board partitioning the vertical portion horizontally and having vent holes makes entry of outside air through the air inlet slow as well as retention of the ozone in the vertical portion long, thereby making the air from outside contact the ozone for a long time.

Providing a plurality of the partitioning boards partitioning the vertical portion horizontally, each partitioning board having vent holes horizontally offset from those of each vertically adjacent partitioning board, makes entry of outside air through the air inlet slower as well as retention of the ozone in the vertical portion longer.

Providing a lot of small holes dispersed in the face of the partitioning board as the vent holes makes the ozone fall through these small vent holes like a shower, thereby making ozone and air contact efficiently.

Making the air intake protrude from the bottom face of the horizontal portion of the air chamber causes ozone, which is large in specific gravity, to be retained at the bottom of the horizontal portion, thereby preventing ozone flow into the air intake.

This invention also adopts a configuration of a beverage dispenser comprising a connecting portion on which a downwardly extending spout of a raw water container filled with drinking water is mounted, a tank provided below the connecting portion for storing drinking water falling from the raw water container, and an extraction valve that extracts drinking water stored in the tank, characterized in that an air intake is provided at least either on top of the tank or on the connecting portion to take air in as the level of water in the tank is lowered, that an air chamber is connected to the air intake, the air chamber being provided with an air inlet so as to let air in from outside, that the air chamber is separated into a plurality of vertically arranged air cells with a plurality of slanting floors slanting alternately in opposite directions, that a vent portion is provided on the lower end of the slanting floor of each upper air cell, the vent portion ventilating to the adjacent lower air cell, that a connecting portion is provided on the side toward which the slanting floor of the uppermost air cell is slanted upward, the connecting portion being connected to the air intake, that an ozone generator is provided in the uppermost air cell for generating ozone from oxygen in the air flowing in from the air inlet, and that the air inlet is provided on the lower side of the slanted floor of the bottom air cell.

In particular, an air intake is provided at least on one of the top of the tank or the connecting portion so that air is taken in as the water level in the tank is lowered, and an air chamber having an air inlet for the outside air is connected to the air intake. A plurality of slanting floors slanting alternately in opposite directions separate the air chamber into a plurality of vertically arranged air cells. A vent portion is provided in the lower end portion of the slanting floor of the upper air cells so that each air cell ventilates to the lower air cells. On the side to which the slanting floor is slanted upwards in the uppermost air cell, a port connected to the air intake is provided. In this uppermost air cell, an ozone generator is provided. In the bottom air cell, an air inlet is provided on the lower end side to which the floor is slanted. With this configuration, ozone, which is large in specific gravity, generated in the uppermost air cell flows downward along the slanted floors and falls sequentially to the lower air cells through the vent portion, thereby efficiently contacting the outside air from the air inlet in the bottom air cell. Bacteria included in the air from outside are killed by the excellent bactericidal effect of ozone, thereby preventing invasion of bacteria into the tank or the raw water container from the root.

Also providing a plurality of the partitioning boards separating the air chamber into a plurality of vertically arranged air cells makes it possible to make paths in which outside air contacts ozone longer, such that bacteria in the air are sterilized thoroughly with this compact configuration.

Providing the ozone generator above the vent portion of the uppermost air cell makes it possible to let the generated ozone immediately fall to the lower air cell, thereby making the bactericidal effect quickly act when the ozone generator starts to operate. This configuration is especially effective when the ozone generator operates synchronously with entry of outside air into the air chamber.

Providing vent holes on the lower end portion of the slanting floor as the vent portion makes entry of outside air through the air inlet slow as well as retention of the ozone in each lower air cell long, thereby making the air from outside contact the ozone for a long time.

Dispersing a lot of small holes on the lower end of the slanting floor as vent holes makes ozone fall from these small holes like a shower and thereby efficiently contact air from outside.

By making the lower end portion provided with the vent holes slanted more steeply downwards than the rest of the slanting floor, part of ozone is retained in this steeply slanted portion, thereby efficiently contacting the air rising from the vent holes.

By providing a filter containing activated carbon in the uppermost air cell so as to partition the port from the portion provided with the ozone generator, excessive ozone is prevented from entering through the air intake into the drinking water.

In the beverage dispenser according to the present invention, an air intake is provided at least on one of the top of the tank or the connecting portion so that air is taken in as the water level in the tank is lowered, and an air chamber having an air inlet for the outside air is connected to an air intake, wherein the air chamber is provided with a horizontal portion connected to the air intake and a vertical portion hanging from the horizontal portion, wherein an ozone generator is provided in the horizontal portion, the ozone generator generating ozone from oxygen in the air that enters through the air inlet, and wherein the air inlet is provided at the bottom of the vertical portion. Ozone, which has large specific gravity, generated in the horizontal portion falls into the vertical portion, contacts efficiently with the outside air from the air inlet on the bottom of the vertical portion, and bacteria included in the air from outside are killed by the excellent bactericidal effect of ozone, thereby preventing invasion of bacteria into the tank or the raw water container from the root.

Also the present invention adopts the configuration comprising an air intake that is provided at least on one of the top of the tank or the connecting portion so that air is taken in as water level in the tank is lowered, an air chamber having an air inlet for the outside air connected to the air intake, a plurality of slanting floors slanting alternately in a lateral direction partitioning the air chamber into a plurality of air cells, a vent portion in the lower end portion of the slanting floor of the upper air cells so that each air cell ventilates to the lower air cells, wherein, on the side to which the slanting floor is slanted upwards in the uppermost air cell, a port connected to the air intake is provided, wherein an ozone generator is provided in the uppermost air cell, and wherein an air inlet is provided on the lower end side to which the floor is slanted in the bottom air cell. Ozone, which has large specific gravity, generated in the uppermost air cell flows along the slanted floor and falls sequentially to the lower air cells, efficiently contacting outside air from the air inlet in the bottom air cell. Bacteria included in the air from outside is killed by the excellent bactericidal effect of ozone, thereby preventing invasion of bacteria into the tank or the raw water container from the root. Since a plurality of slanting floors partition the air chamber vertically into a plurality of air chambers, the path in which ozone contacts the air from outside becomes longer in a compact structure and bacteria included in the air are thus thoroughly sterilized.

DETAILED DESCRIPTION OF THE INVENTION

Figure 1:
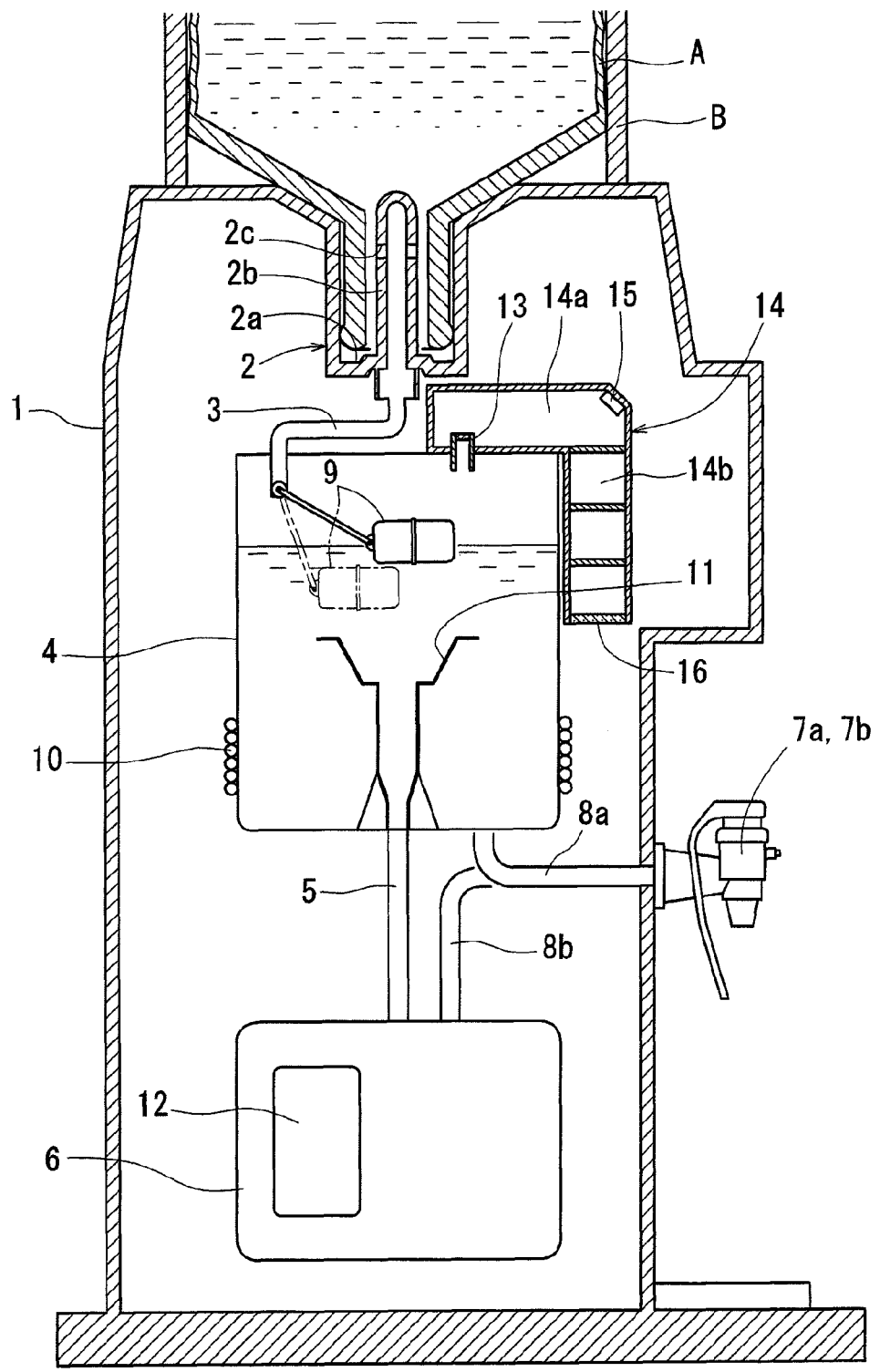
FIG. 1 is a vertical sectional view of a beverage dispenser according to a first embodiment.

Embodiments of the invention are described with reference to the drawings. FIGS. 1 to 4 show the first embodiment. As shown in FIG. 1, this beverage dispenser includes a casing 1 having a connecting portion 2 on top of the casing 1 to which a downwardly extending spout of a raw water container A filled with drinking water is connected, a cold tank 4 connected below the connecting portion to the connecting portion 2 through a pipe 3, a hot tank 6 below the cold tank 4, connected with the cold tank 4 through a pipe 5, and extraction valves 7a and 7b for cold water and hot water, respectively, mounted on the front surface of the casing 1 and connected to the bottom of the cold tank 4 and the top of the hot tank 6 through extraction pipes 8a and 8b, respectively.

The connecting portion 2 comprises a recessed portion 2a in which the spout of the raw water container A is inserted, and a cylindrical protrusion 2b protruding from the center of the recessed portion 2a and inserted in the spout of the raw water container A. The cylindrical protrusion 2b has holes 2c through which drinking water in the raw water container A is fed into the pipe 3. In this embodiment, the raw water container A is made of a soft material so that the raw water container A collapses by atmospheric pressure as the contained drinking water falls, and a support frame B supports the outer periphery of the raw water container A.

The cold tank 4 is provided with a float valve 9 and, as shown by dash-dot lines in the figure, the float valve 9 opens as the water level in the cold tank lowers. Then the drinking water in the raw water tank A is supplied through the pipe 3. A cooling device 10 is provided on the outer periphery of the cold tank 4 at its lower portion. A funnel-shaped outlet 11 protrudes upward from the cooling device 10. A connecting pipe 5 connects the outlet 11 to the hot tank 6. Cold water at the bottom of the cold tank 4 is cooled by the cooling device 10 and extracted by the extraction pipe 8a, and relatively warm drinking water is supplied to the hot tank 6 through the outlet 11. The hot tank 6 is provided with a heating device 12 so that the drinking water supplied through the connecting pipe 5 is heated. The heated water is sent to the extraction pipe 8b connected to the top of the hot tank 6 by water pressure from the cold tank 4.

Figure 2:
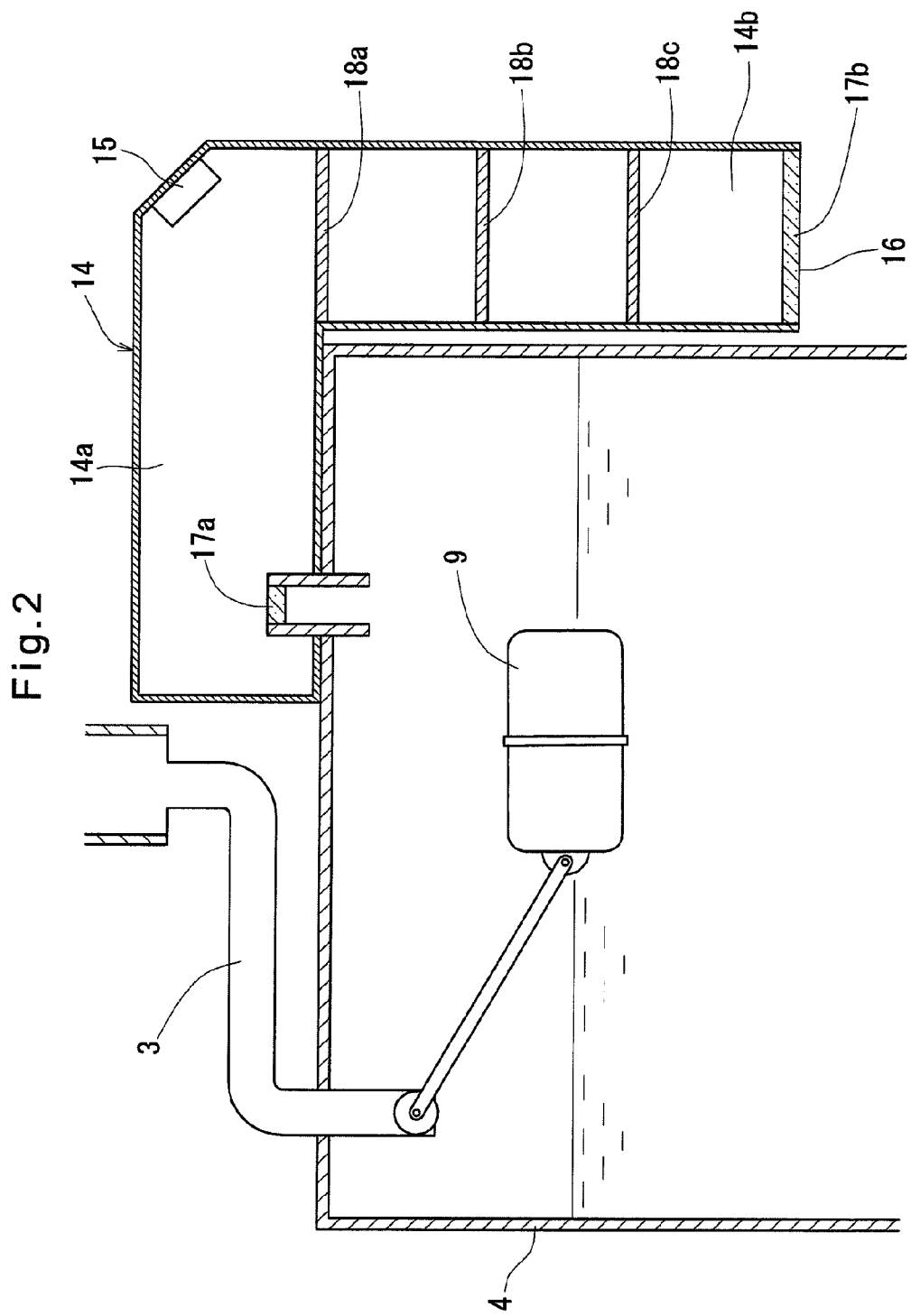
FIG. 2 is an enlarged vertical sectional view of a portion of FIG. 1.

As shown in FIG. 2, on the top of the cold tank 4, an air intake 13 is provided so that air is taken in as the level of water inside the tank is lowered. An air chamber 14 is connected to the air intake 13. The air chamber 14 comprises a horizontal portion 14a connected to the air intake 13 and extending along the top of the cold tank 4 and a vertical portion 14b hanging from one end of the horizontal portion 14a along the side wall of the cold tank 4. An ozone generator 15 is provided in the horizontal portion 14a right over the vertical portion 14b, and an air inlet 16 is provided on the bottom of the vertical portion 14b to introduce outside air.

The ozone generator 15 is an ultraviolet lamp radiating ultraviolet rays to generate ozone from oxygen in the air. The ozone generator is activated intermittently by a controller (not shown in the figures) as well as by a switch (not shown in the figures) that cooperates with the float valve 9. Ozone is thus generated efficiently when the water level in the cold tank 4 is lowered and air is introduced through the air inlet 16.

Since ozone has 1.5 times as large a specific gravity as air, most of the ozone generated by the ozone generator 15 in the horizontal portion falls into the vertical portion 14b immediately below. A part of the generated ozone flows toward the air intake 13 in the horizontal portion 14a and is retained at the bottom of the horizontal portion 14a. Since the air intake 13 protrudes from the bottom face of the horizontal portion 14a, the ozone retained at the bottom of the horizontal portion 14a does not flow directly into the air intake 13.

Activated carbon filters 17a, 17b containing activated carbon are attached to the top end of the air intake 13 and the air inlet 16 at the bottom end of the vertical portion 14b, respectively. These activated carbon filters 17a, 17b reduce ozone generated by the ozone generator 15 to oxygen gas and prevent excessive ozone from entering the cold tank 4 through the air intake 13 or flowing outside through the air inlet 16.

Figure 3:
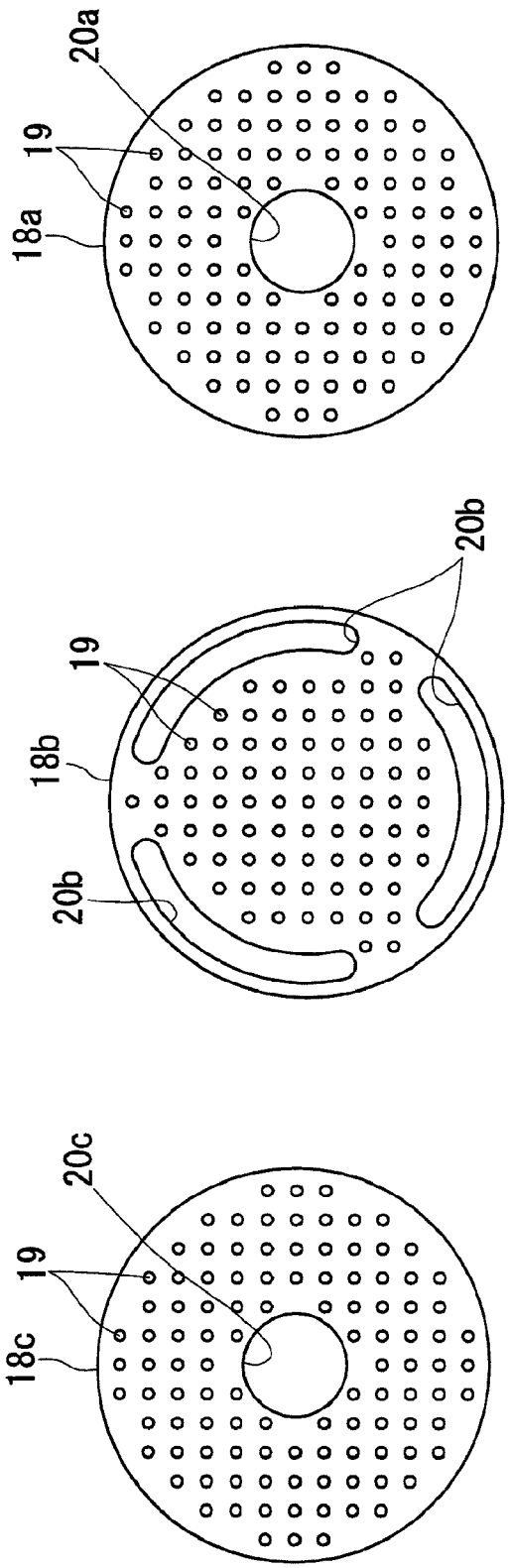
FIG. 3 is a plan view of each partitioning board of the air chamber of FIG. 2.

Also, three partitioning boards 18a, 18b, 18c are provided in the vertical portion 14b, partitioning the vertical portion 14b into vertically arranged chambers. As shown in FIG. 3, a large number of small vent holes 19 are interspersed in the surface of each of the partitioning boards 18a, 18b, 18c. Also, relatively large vent holes 20a, 20c are provided in the center of the top and bottom partitioning boards 18a, 18c, respectively, and the middle partitioning board 18b is provided with arc-shaped vent holes 20b along its outer periphery.

Figure 4:
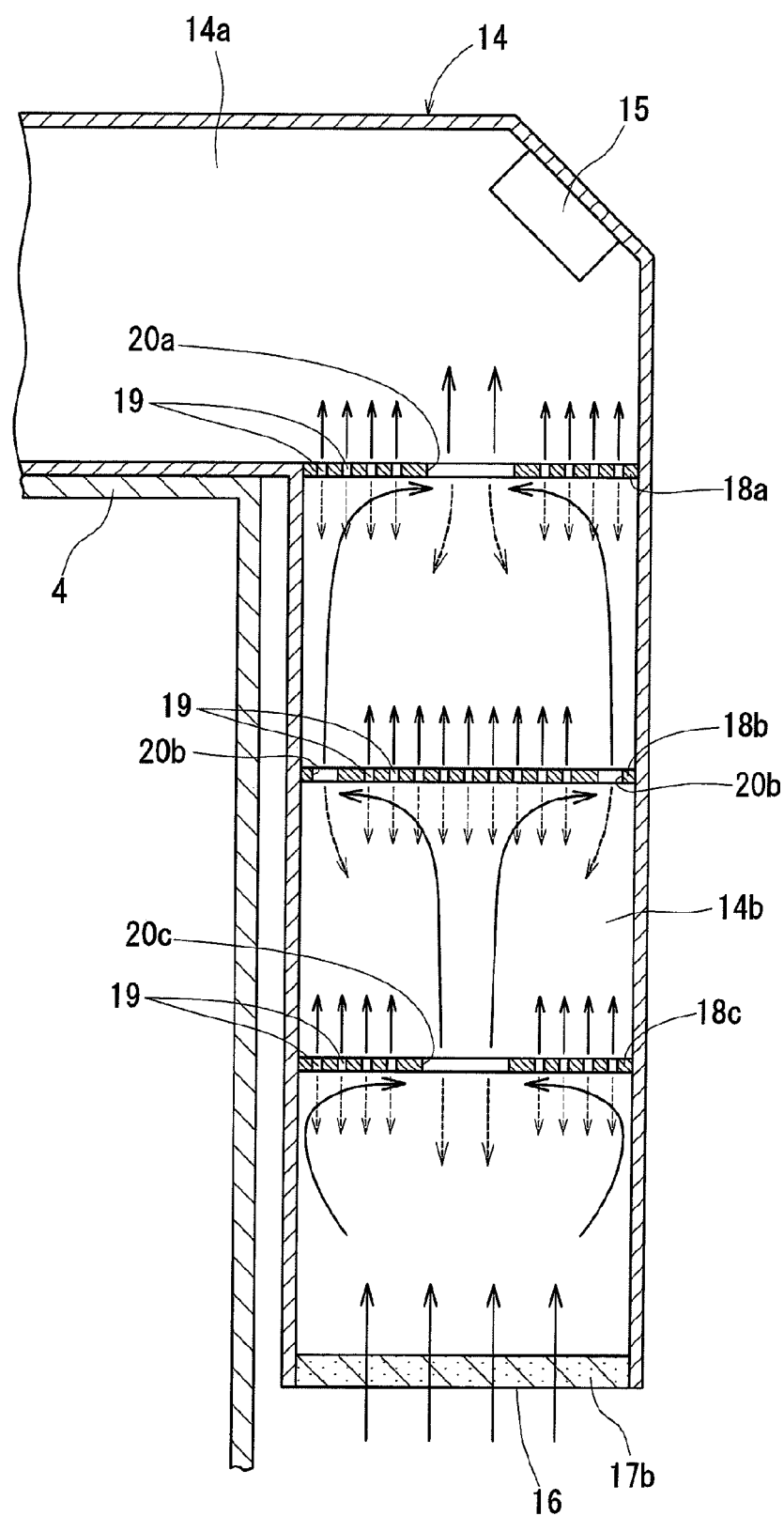
FIG. 4 is a sectional view schematically showing flows of ozone and air in the vertical portion of the air chamber of FIG. 2.

FIG. 4 schematically shows the flow of ozone falling inside and the flow of air through the air inlet 16 into the bottom of the vertical portion 14b. As shown by broken arrows, a part of the ozone falls through the small vent holes 19 in each partitioning board 18a, 18b, 18c like a shower, and the rest falls circumventing through each vent hole 20a, 20b, 20c. Also, air from outside is retained at each partitioning board 18a, 18b, 18c and rises through each small vent hole 19 and vent holes 20a, 20b, 20c, as shown by solid arrows. The falling ozone and the rising air from outside thus contact efficiently taking enough time, and bacteria in the air are killed by bactericidal effect of ozone.

Figure 5:
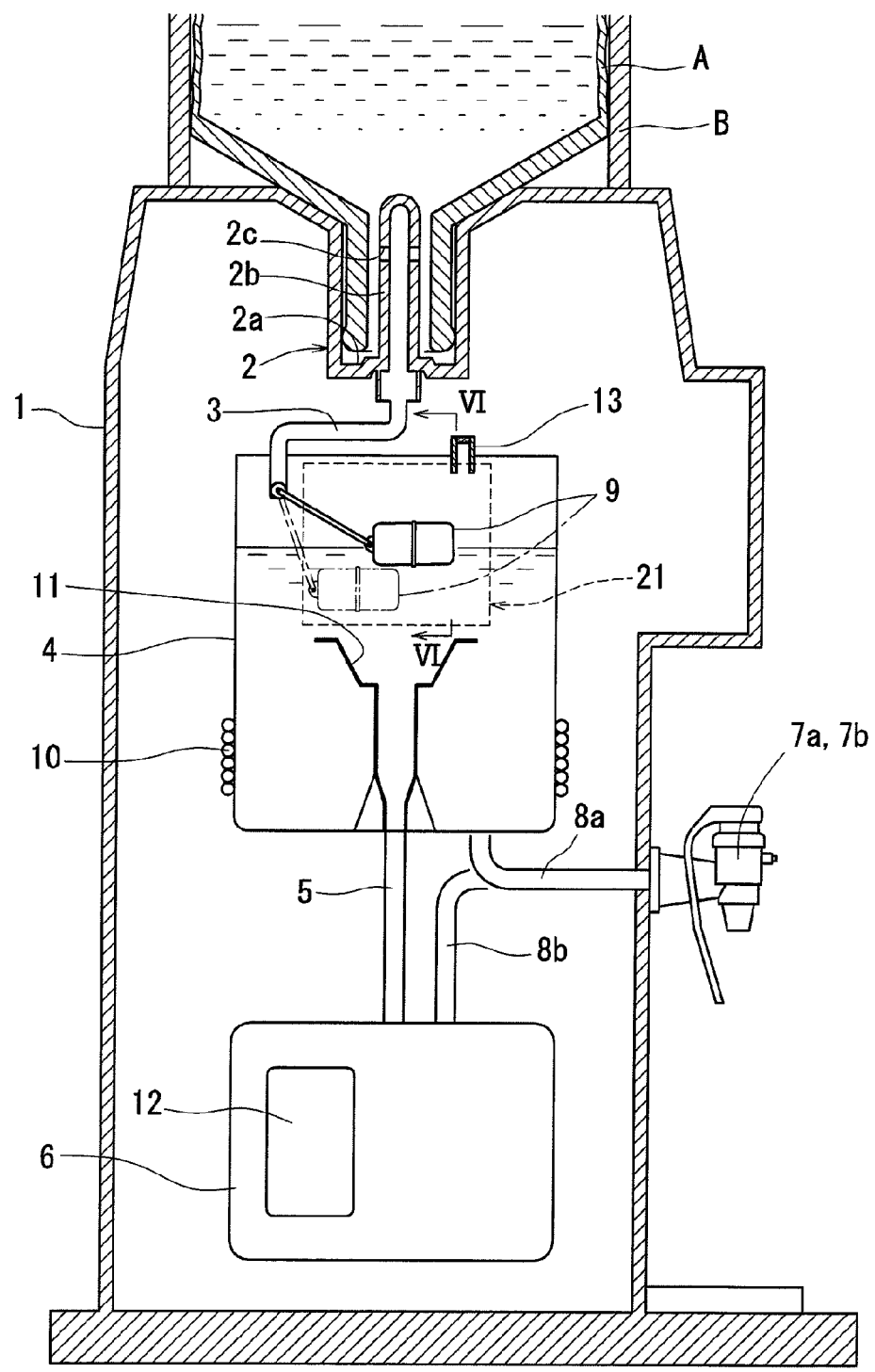
FIG. 5 is a vertical sectional view of a beverage dispenser according to a second embodiment.
Figure 6:
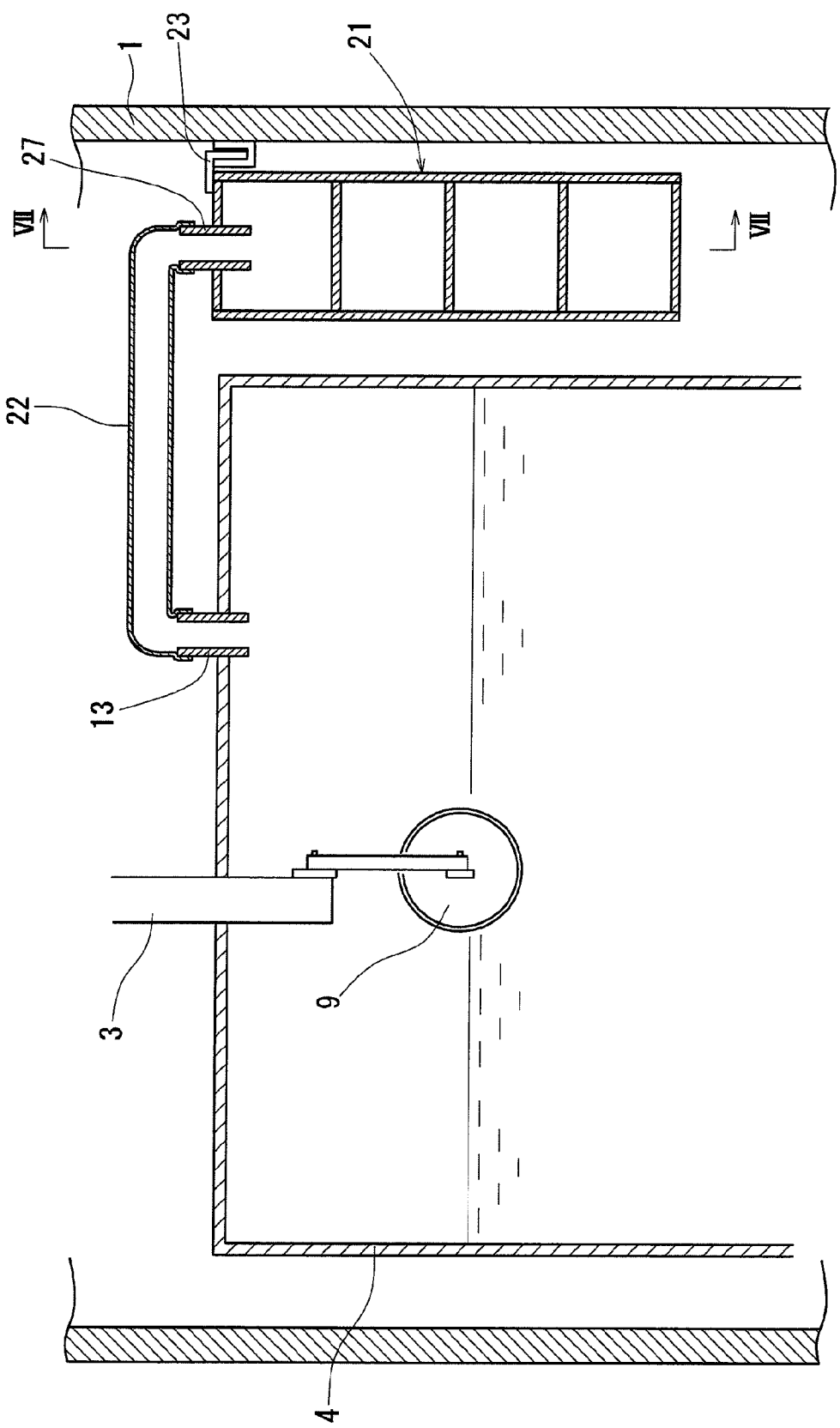
FIG. 6 is a sectional view taken along the line VI-VI of FIG. 5.
Figure 7:
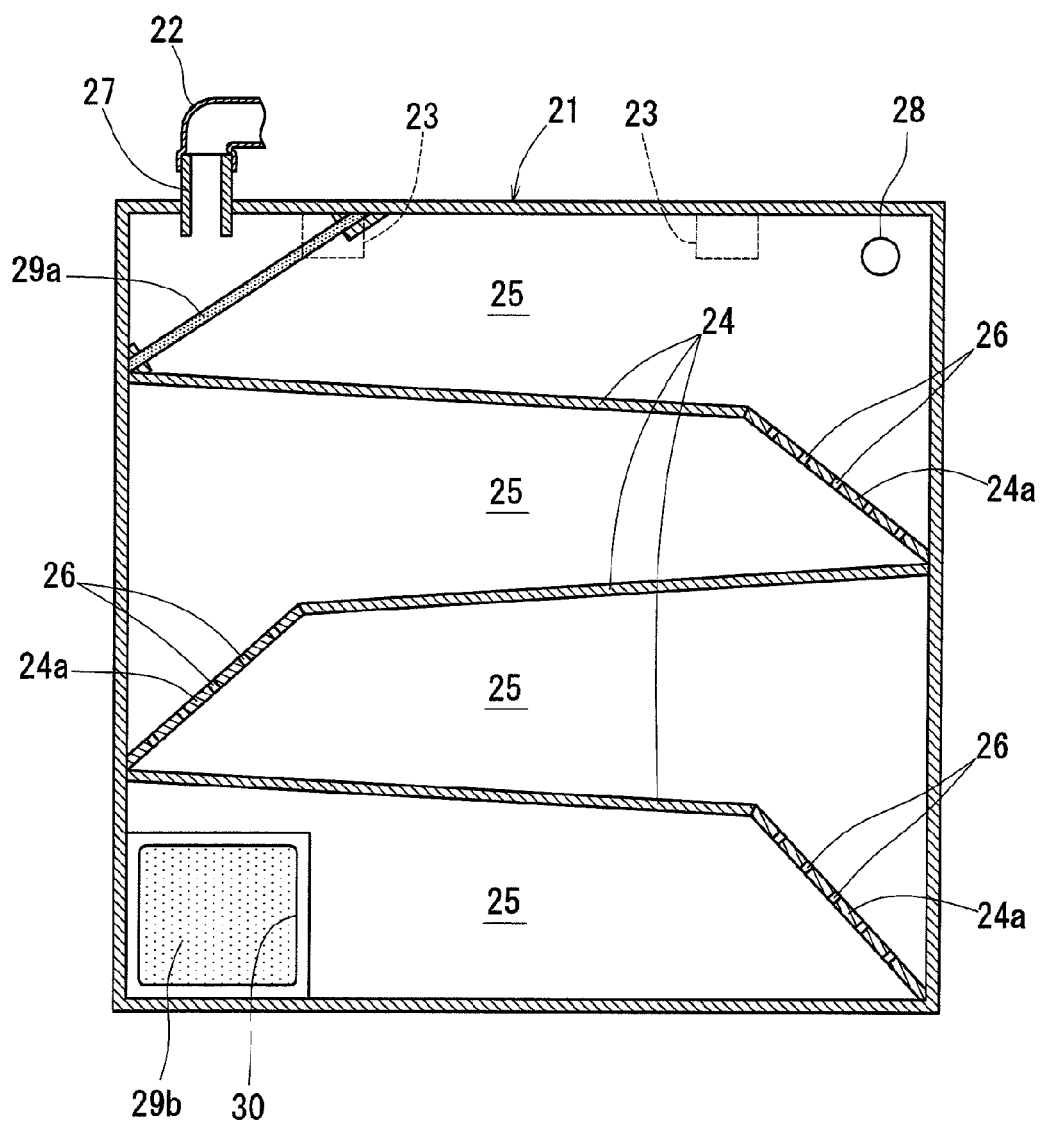
FIG. 7 is a sectional view taken along the line VII-VII of FIG. 6.

FIGS. 5 to 8 show the second embodiment. This beverage dispenser has, as shown in FIG. 5, basically the same structure as the first embodiment. As shown in FIGS. 6 and 7, the second embodiment is different from the first embodiment in the structure of the air chamber 21 connected to the air intake 13 on the top of the cold tank 4. The air chamber 21 of this embodiment is connected to the air intake 13 through a hose 22 and attached to the inner face of the casing 1 with a hook 23.

As shown in FIG. 7, the air chamber 21 is flat box-shaped, and wide in vertical and lateral directions. A plurality of slanting floors 24 slanting alternately in opposite directions partition the air chamber 21 into a plurality of vertically arranged air cells 25. Each of the slanting floors 24 of the upper three air cells 25 has a lower end portion 24a slanted steeply downward. In the lower end portions 24a, a large number of small holes 26 are dispersed as vent holes so that each air cell 25 ventilates to the lower air cell 25. The floor of the lowest air cell 25 is flat.

On the side of the uppermost air cell 25 of the air chamber 21 toward which the slanting floor 24 is slanted upward, a port (connecting port) 27 connected to the air intake 13 through the hose 22 is provided. Over the vent portion of the uppermost air cell 25 where the small holes 26 are provided, an ozone generator 28 is provided. An activated carbon filter 29a containing activated carbon is provided so as to separate the port 27 from the portion provided with the ozone generator 28. In the bottom air cell 25, on the side face on the side of the vent portion opposite to the upper air cell 25, an air inlet 30 is provided to introduce outside air, provided with an activated carbon filter 29b. These activated carbon filters 29a, 29b reduce ozone generated by the ozone generator 28 to oxygen gas and prevent excessive ozone from entering the cold tank 4 through the port 27 and flowing outside through the air inlet 30.

The ozone generator 28 is an ultraviolet lamp radiating ultraviolet rays to generate ozone from oxygen in the air, which is the same as the first embodiment. The ozone generator is activated intermittently by a controller (not shown) and a switch (not shown) that works with the float valve 9. Ozone is thus generated efficiently when the water level in the cold tank 4 is lowered and air is let in from the air inlet 30.

Figure 8:
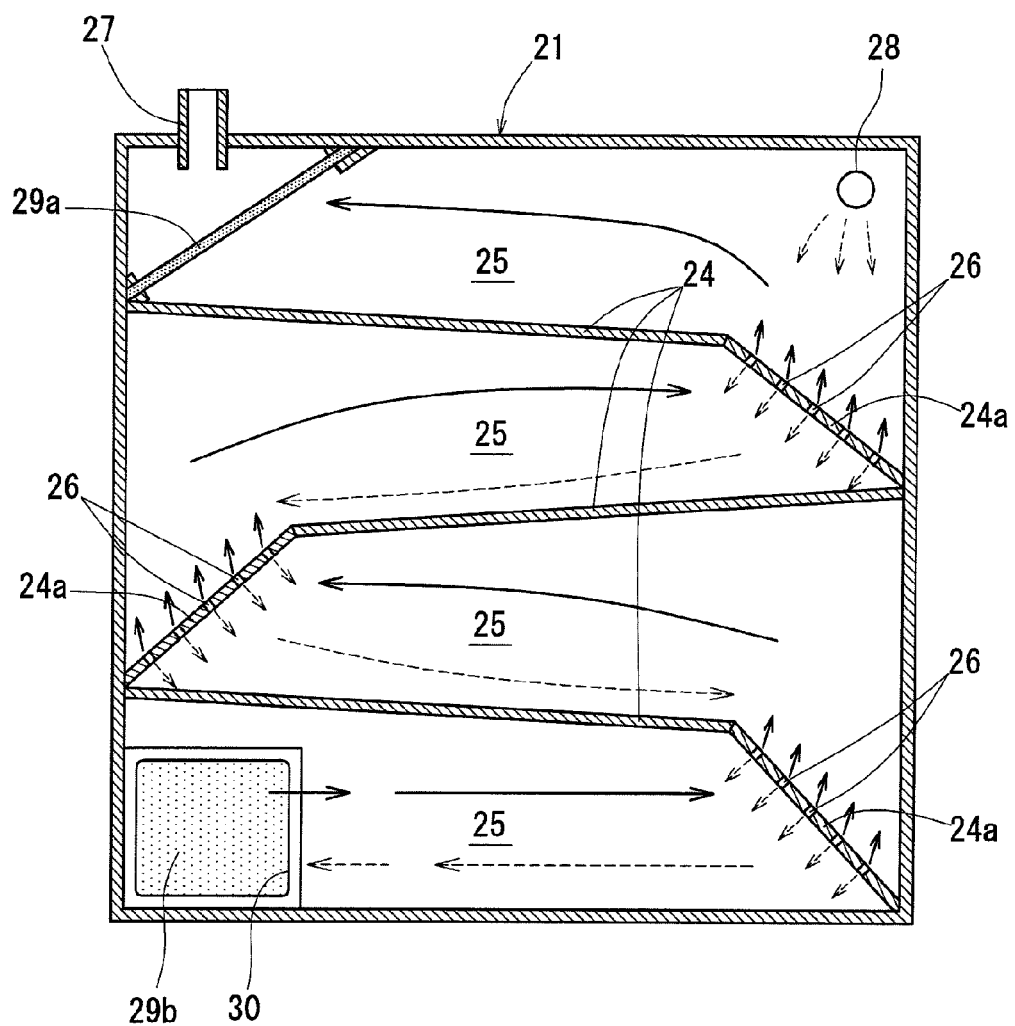
FIG. 8 is a sectional view schematically showing flows of ozone and air in the air chamber of FIG. 7.

FIG. 8 is a schematic view of the flows of ozone generated in the uppermost air cell 25 and the outside air let in from the air inlet 30. Since ozone has 1.5 times as large a specific gravity as air, most of the ozone, as shown by broken arrows, falls from a large number of small holes 26 in the ventilating portion to the lower air cell like a shower, flows downward along the slanted floor 24 in the lower air cells 25, and further falls to the lower air cells 25 from each small hole 26 on the lower end portion 24a. Also, outside air that enters through the air inlet 30 at the bottom air cell 25, as shown by solid arrows, is retained at the upper side of the slanting floor 24 and sequentially rises to the upper air cells 25 through the small holes 26. The ozone falling to the lower air cells 25 and the air rising to the upper air cells 25 thus contact efficiently taking enough time, and bacteria in the air are killed by the bactericidal effect of ozone.

In the embodiments described above, the raw water container is made of a soft material and the air chamber provided with the ozone generator is connected to the air intake provided on the cold tank. When using a hard raw water container, to which air is let in, the air chamber can be connected also to the air intake provided on the connecting portion, and the air chamber can be shared between the cold tank and the air intake on the connecting portion.

While, in the embodiments described above, each beverage dispenser has a cold tank and a hot tank and serves water as a beverage, a beverage dispenser according to the present invention may have only one tank, and the beverage served is not limited to water.

What is claimed is:

1. A beverage dispenser comprising
   a connecting portion to connect to a downwardly extending spout of a raw water container filled with drinking water,
   a tank provided below said connecting portion for storing said drinking water falling from the raw water container, and
   an extraction valve that extracts drinking water stored in said tank,
   wherein an air intake is provided at least either on top of said tank or on said connecting portion to take air in as a water level in said tank is lowered,
   wherein an air chamber is connected to said air intake, said air chamber being provided with an air inlet to allow intake of air into the air chamber from outside the air chamber,
   wherein said air chamber comprises a horizontal portion connected to said air intake and a vertical portion hanging from said horizontal portion,
   wherein an ozone generator is provided in said horizontal portion for generating ozone from oxygen in the air that enters through said air inlet,
   wherein said air inlet is provided at a bottom of said vertical portion, and wherein said vertical portion is provided with at least one partitioning board partitioning said vertical portion horizontally and having vent holes.

2. The beverage dispenser according to claim 1 wherein said ozone generator is provided right over said vertical portion.

3. The beverage dispenser according to claim 2 wherein said air intake protrudes from a bottom face of the horizontal portion of said air chamber.

4. The beverage dispenser according to claim 1 wherein a plurality of said partitioning boards are provided, partitioning said vertical portion horizontally, each partitioning board having vent holes horizontally offset from those of each vertically adjacent partitioning board.

5. The beverage dispenser according to claim 4 wherein said vent holes are a plurality of small holes dispersed in a face of said partitioning board.

6. The beverage dispenser according to claim 4 wherein said air intake protrudes from a bottom face of the horizontal portion of said air chamber.

7. The beverage dispenser according to claim 1 wherein said vent holes are a plurality of small holes dispersed in a face of said partitioning board.

8. The beverage dispenser according to claim 7 wherein said air intake protrudes from a bottom face of the horizontal portion of said air chamber.

9. The beverage dispenser according to claim 1 wherein said air intake protrudes from a bottom face of the horizontal portion of said air chamber.

10. A beverage dispenser comprising
    a connecting portion to connect to a downwardly extending spout of a raw water container filled with drinking water,
    a tank provided below said connecting portion for storing drinking water falling from the raw water container, and
    an extraction valve that extracts drinking water stored in said tank,
    wherein an air intake is provided at least either on top of said tank or on said connecting portion to take air in as a water level in said tank is lowered,
    wherein an air chamber is connected to said air intake, said air chamber being provided with an air inlet to allow intake of air into the air chamber from outside the air chamber,
    wherein said air chamber is separated into a plurality of vertically arranged air cells with a plurality of slanting floors slanting alternately in opposite directions, said plurality of vertically arranged air cells including a bottom air cell and a plurality of upper air cells,
    wherein vent portions are respectively provided in lower ends of said slanting floors, each of said vent portions providing ventilation from one of said upper air cells to a one of the plurality of vertically arranged air cells disposed adjacently below said one of said upper air cells
    wherein a connecting port is provided on a side of said air chamber toward which an uppermost one of said slanting floors is slanted upward, said connecting port being connected to said air intake,
    wherein an ozone generator is provided in an uppermost one of said upper air cells for generating ozone from oxygen in the air flowing in through said air inlet, and
    wherein said air inlet is provided in said bottom air cell on one of a right-hand side and a left-hand side of said bottom air cell, while the vent portion provided in the lower end of a bottom-most one of the said slanting floors is provided on the other of the right-hand side and the left-hand side of said bottom air cell.

11. The beverage dispenser according to claim 10 wherein said ozone generator is provided above said vent portion in the lower end of an uppermost one of said slanting floors.

12. The beverage dispenser according to claim 11 wherein each of said vent portions is constituted by a plurality of vent holes provided in the lower end of a respective one of said slanting floors.

13. The beverage dispenser according to claim 11 wherein a filter containing activated carbon is provided in said uppermost air cell so as to separate said connecting port from said ozone generator.

14. The beverage dispenser according to claim 10 wherein each of said vent portions is constituted by a plurality of vent holes provided in the lower end of a respective one of said slanting floors.

15. The beverage dispenser according to claim 14 wherein, for each of said slanting floors, said lower end is slanted more steeply downward than remainder of the slanting floor.

16. The beverage dispenser according to claim 14 wherein a filter containing activated carbon is provided in said uppermost air cell so as to separate said connecting port from said ozone generator.

17. The beverage dispenser according to claim 10 wherein each of said vent portions is constituted by a plurality of small holes dispersed in the lower end of a respective one of said slanting floors.

18. The beverage dispenser according to claim 17 wherein, for each of said slanting floors, said lower end is slanted more steeply downward than a remainder of said slanting floor.

19. The beverage dispenser according to claim 17 wherein a filter containing activated carbon is provided in said uppermost air cell so as to separate said connecting port from said ozone generator.

20. The beverage dispenser according to claim 10 wherein a filter containing activated carbon is provided in said uppermost air cell so as to separate said connecting port from said ozone generator.

21. The beverage dispenser according to claim 15 wherein a filter containing activated carbon is provided in said uppermost air cell so as to separate said connecting port from said ozone generator.

* * * * *